United States Patent
Frankowski et al.

(10) Patent No.: US 10,366,547 B2
(45) Date of Patent: Jul. 30, 2019

(54) CLOUD-BASED FUEL QUALITY RECORDING AND FUEL STATION SELECTION SYSTEM, AND METHOD OF UTILIZING SAME

(71) Applicant: Continental Automotive Systems, Inc., Auburn Hills, MI (US)

(72) Inventors: David Frankowski, Monroe, MI (US); Marvin L. Lynch, Detroit, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 177 days.

(21) Appl. No.: 15/385,263

(22) Filed: Dec. 20, 2016

(65) Prior Publication Data
US 2018/0174375 A1    Jun. 21, 2018

(51) Int. Cl.
*G07C 5/00*    (2006.01)
(52) U.S. Cl.
CPC .................................. *G07C 5/008* (2013.01)
(58) Field of Classification Search
None
See application file for complete search history.

(56) References Cited

U.S. PATENT DOCUMENTS

| | | | | |
|---|---|---|---|---|
| 8,738,277 B1* | 5/2014 | Kurosawa | .......... | G01C 21/3679 701/123 |
| 8,744,723 B2* | 6/2014 | Jones | .................. | F02D 41/0025 701/103 |
| 9,243,929 B2 | 1/2016 | Burlingham et al. | | |
| 2007/0157903 A1 | 7/2007 | Zurlo | | |
| 2008/0167812 A1* | 7/2008 | Geelen | ............... | G01C 21/3641 701/469 |
| 2009/0064969 A1 | 3/2009 | Miersch-Wiemers | | |
| 2009/0093945 A1* | 4/2009 | Okumura | ............ | F02D 41/1494 701/103 |
| 2009/0251302 A1* | 10/2009 | Cunningham | ...... | F02D 19/0628 340/438 |
| 2011/0137470 A1* | 6/2011 | Surnilla | ................ | G01C 21/26 700/282 |
| 2015/0224997 A1 | 8/2015 | Glugla et al. | | |
| 2015/0316406 A1* | 11/2015 | Gale | .................. | G01F 23/0076 705/39 |
| 2016/0300408 A1* | 10/2016 | Dudar | .................. | G07C 5/0816 |
| 2018/0114378 A1* | 4/2018 | Slusar | .................. | G07C 5/0808 |

FOREIGN PATENT DOCUMENTS

WO    WO-2015088556 A2 *    6/2015    ............. G06Q 50/30

* cited by examiner

*Primary Examiner* — Mussa A Shaawat
*Assistant Examiner* — Abdhesh K Jha

(57)    ABSTRACT

A system and method for selecting a fueling station for vehicle refueling, including receiving fuel information from a remote device corresponding to one or more fueling stations near a vehicle; upon the vehicle travelling to a selected one of the one or more fueling stations, setting a flag to a value based upon a fuel grade of fuel used to refuel the vehicle at the selected one of the one or more fueling stations; and capturing location information for at least one of the vehicle and the selected one of the one or more fueling stations. Subsequent to refueling at the selected one of the one or more fueling stations, the method further includes determining fuel information of the fuel used to refuel the vehicle; and sending the flag, the fuel information of the fuel used to refuel the vehicle, and the captured location information to the remote device.

19 Claims, 3 Drawing Sheets

US 10,366,547 B2

CLOUD-BASED FUEL QUALITY RECORDING AND FUEL STATION SELECTION SYSTEM, AND METHOD OF UTILIZING SAME

FIELD OF INVENTION

The present invention generally relates to a system and service for recording and providing fuel quality information, and particularly to such a system and service in which fuel information associated with fuel stations are used for making fuel purchasing decisions.

BACKGROUND

Motor vehicles have sophisticated control systems for controlling the vehicles' engines. A typical control system includes an engine control unit (ECU) and a number of sensors communicatively coupled to the ECU which provide sensed data thereto. The ECU then uses the sensed data in executing control algorithms for controlling components of the vehicle engine. The control algorithms are in the form of software programs stored in ECU memory.

Calculations performed by some existing ECUs include a calculation of a value from which the research octane number (RON) of the fuel used by the vehicle can be inferred. The RON is a standard measure of the performance of an engine fuel. The higher the octane number, the more compression the fuel can withstand before detonating (igniting). In broad terms, fuels with a higher octane rating are used in high performance gasoline engines that require higher compression ratios. In contrast, fuels with lower octane numbers (but higher cetane numbers) are better for diesel engines, because diesel engines (also referred to as compression-ignition engines) do not compress the fuel, but rather compress only air and then inject fuel into the air which was heated by compression. The calculation of the RON for the vehicle's fuel has been used by the vehicle's ECU in controlling the vehicle engine.

Another calculation performed by some existing ECUs is a calculation from which the quality of the vehicle fuel can be inferred. Like the calculation of RON, the calculation of fuel quality has been used in some ECUs to control the operation of the vehicle engine.

Motor vehicles are further known to include telematics devices which are used to wirelessly communicate with remote devices and satellites to perform, among other things, global positioning satellite (GPS) location functionality.

SUMMARY

Example embodiments of the present disclosure are directed to use of a vehicle's ECU calculations and telematics device to provide a cloud-based subscription service directed to fuel information of fuel stations. A system forming the cloud-based subscription service includes an electronics device. In an example embodiment, the electronics device includes a transceiver configured to wirelessly communicate with remote devices; and a control unit communicatively coupled to the transceiver. The control unit includes non-transitory memory having instructions stored therein which, when executed by the control unit, causes the control unit to receive, from a remote device via the transceiver, fuel information corresponding to one or more fueling stations in proximity to a vehicle associated with the electronics device; upon the vehicle moving to a selected one of the one or more fueling stations, set a flag to a value based in part upon a fuel grade of fuel used to refuel the vehicle at the selected one of the one or more fueling stations; and capture location information for at least one of the vehicle and the selected one of the one or more fueling stations. The control unit further performs instructions which, subsequent to refueling at the selected one of the one or more fueling stations, determine fuel information of the fuel used to refuel the vehicle, and cause the transceiver to send the flag value, the fuel information of the fuel used to refuel the vehicle, and the captured location information to the remote device. By receiving fuel information from a remote device corresponding to nearby fuel stations and providing to the remote device fuel information about fuel taken from one of the fuel stations, the fuel information provided by the remote device is current for use in making refueling decisions by subscribers.

In an example embodiment, the fuel information corresponding to the one or more fueling stations and the fuel information of the fuel used to refuel the vehicle include at least one of fuel quality information and research octane number (RON) information.

BRIEF DESCRIPTION OF THE DRAWINGS

Aspects of the invention will be explained in detail below with reference to an exemplary embodiment in conjunction with the drawings, in which.

DETAILED DESCRIPTION

Figure 1:
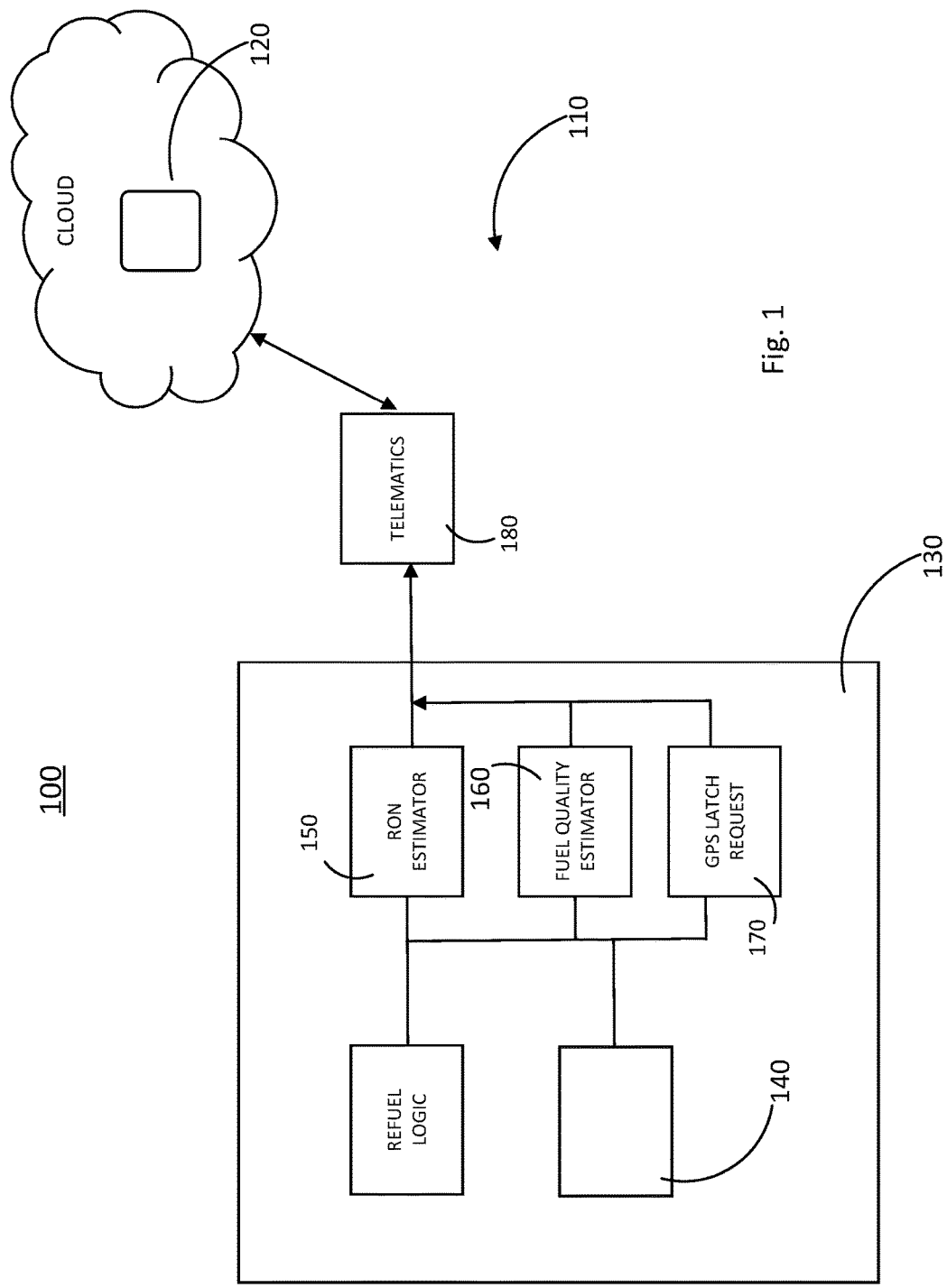
FIG. 1 is a block diagram of a fuel recording system according to an example embodiment.

With reference to FIG. 1, there is disclosed a system 100. In general terms, system 100 is configured to generate and maintain fuel related information to which subscribers have access. In one aspect, a first group of subscribers are operators of motor vehicles such that the fuel related information is used thereby for selecting fuel stations for vehicle refueling. In another aspect, a second group of subscribers are those who wish to monitor fuel related information corresponding to various fueling stations for different reasons, such as oil refineries or fuel suppliers, to confirm that fuel provided thereto meets requirements or expectations. By providing fuel information in real time or near real time, subscribers may make sound refueling decisions and/or ensure fuel requirements are met.

System 100 includes an electronics device 110 which communicates with a remote device 120 in which fuel related information is collected, compiled and maintained. In an example embodiment, remote device 120 is a server and electronics device 110 and remote device 120 communicate with each wirelessly via the air interface. Remote device 120 may be in the cloud and is configured for communicating the fuel related information maintained by remote device 120 to subscribers, such as paid subscribers. Electronics device 110 may include a user interface (not shown), such as a graphic user interface, for communicating with the user/owner of electronics device 110, with part of the user interface including a touch screen for receiving user input as well as voice recognition components (microphone and voice recognition circuitry) for receiving voice-based user input.

In accordance with an example embodiment, electronics device 110 includes a controller 130 or control unit which generates the fuel related information. Controller 130 is at least one controller or microcontroller and includes one or more processors (not shown) and memory 140 having stored therein software program code which, when executed by controller 130, causes controller 130 to generate the fuel related information.

In an example embodiment, controller 130 is the ECU of a motor vehicle. As such, controller 130 receives sensor data from a number of sensors disposed in the motor vehicle and generates, among other things, data related to RON and data related to fuel quality based upon the sensed data, for use in operating the engine of the motor vehicle. Accordingly, the software program code executed by controller (ECU) 130 includes a RON estimator block 150 for calculating or otherwise estimating RON information, as well as a fuel quality estimator block 160 which calculates or otherwise estimates fuel quality of the fuel in the fuel tank of the motor vehicle, for use in efficiently operating the engine thereof. The software program code executed by controller 130 may also include a GPS latch request, which is used to request that the vehicle location be captured.

In the example embodiment illustrated in FIG. 1, electronics device 110 further includes telematics device 180 which is communicatively coupled to controller 130. Telematics device 180 is configured to gather and wirelessly share vehicle related data with one or more remote devices, including remote device 120. Telematics device 180 itself may include at least one controller, microcontroller or processor with memory (not shown) having instructions for performing functions commonly found in known telematics devices, such as GPS related functionality. As such, telematics device 180 includes one or more transceivers (not shown) implementing one or more wireless communication mechanisms, such as RF, Wi-Fi, Bluetooth, RFID, etc. Further, in an example embodiment, controller 130 sends fuel data relating to fuel consumed by the vehicle to telematics device 180 for subsequent transmission to remote device 120. Telematics device 180 is also configured to receive from remote device 120 fuel data relating to fuel stations in proximity to the present location of the vehicle. The sharing of information between electronics device 110 and remote device 120 will be described in greater detail below.

As mentioned, in an example embodiment, controller 130 is an ECU of a vehicle. In this embodiment, telematics device 180 is the telematics unit of the vehicle. In an alternative embodiment, electronics device 110 is formed by a combination of a vehicle ECU and a hand-held or other mobile, portable device, such as a cellular telephone, smart watch or the like. Specifically, the vehicle ECU may include RON estimator 150 and fuel quality estimator 160, as discussed above, and the hand-held/mobile device may include GPS telematics device 180. In this alternative embodiment, the vehicle ECU calculates or otherwise estimates the RON and fuel quality of the vehicle's fuel and communicates (wirelessly, for example) the RON and fuel quality calculations with the hand-held/mobile device. The functions performed by the hand-held/mobile device are, for example, executed as part of a mobile application for the hand-held/mobile device.

In accordance with an example embodiment, electronics device 110 receives from remote device 120 fuel information relating to fuel stations in the immediate vicinity of the vehicle associated with electronics device 110, for use in selecting a fuel station at which to refuel the vehicle. Electronics device 110 also calculates RON and fuel quality data for the vehicle's fuel after refueling and shares the calculations with remote device 120. In this way, the fuel information maintained and provided by remote device 120, upon which refueling decisions are made, is current and thus of more value to owners of electronics device 120.

Figure 2:
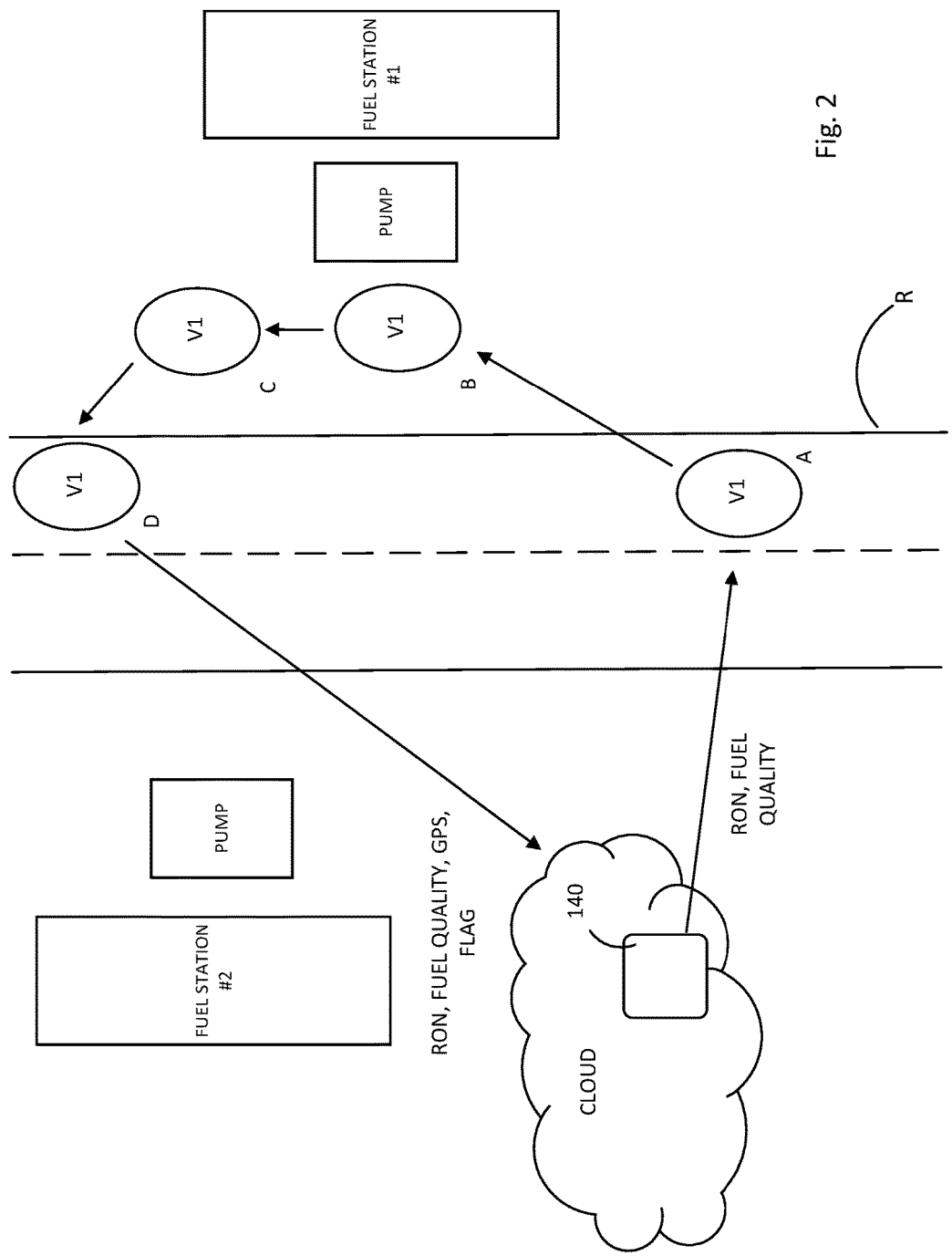
FIG. 2 is a diagram illustrating usage of the system of FIG. 1.
Figure 3:
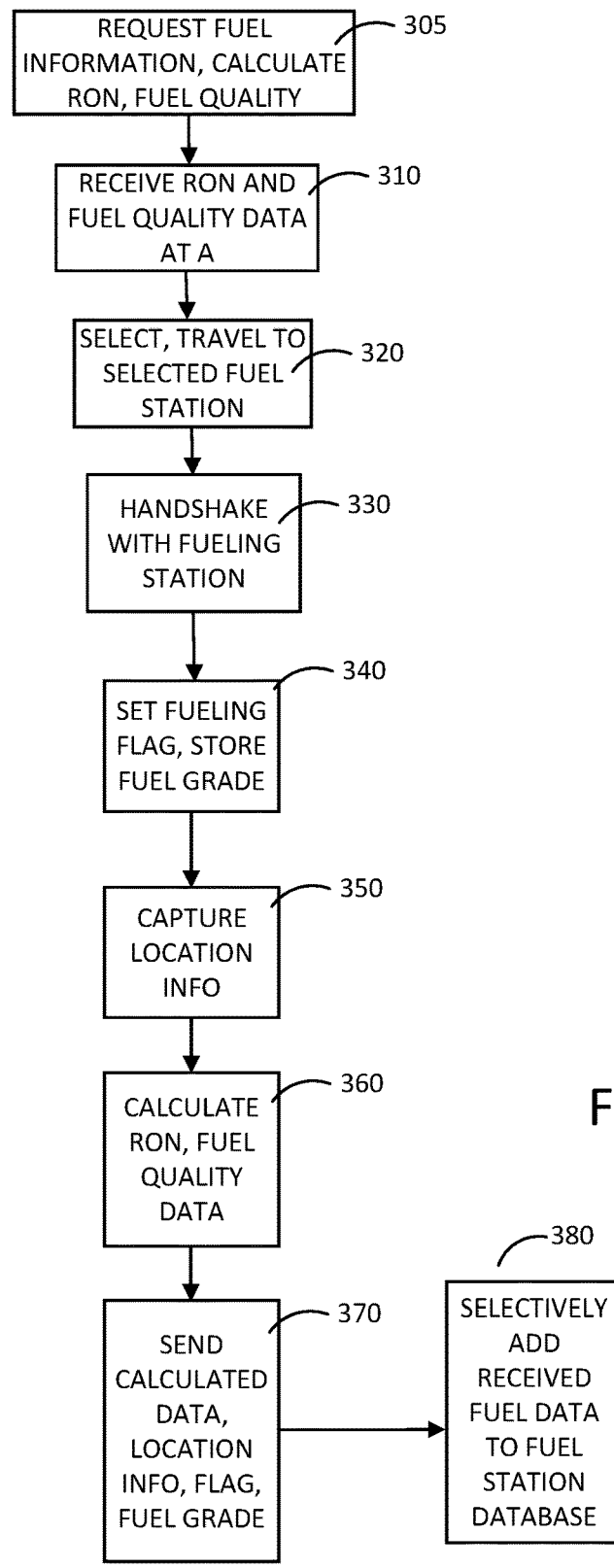
FIG. 3 is a flowchart illustrating the usage of the system of FIG. 2.

With reference to FIGS. 2 and 3, a method of operation of system 100 will be described according to an example embodiment. While at location A along a roadway R, vehicle V1 receives fuel information from remote device 120 at 310. Reception of fuel information may be in response to electronics device 110 requesting fuel information from remote device 120 at 305. Electronics device 110 may request fuel information automatically based upon the fuel level in the fuel tank of vehicle V1 falling below a predetermined level, or in response to the driver of vehicle V1 desiring to refuel and requesting electronics device 110 to make the request using the user interface of electronics device 110. Alternatively, remote device 120 may send the fuel information to vehicle V1 automatically, such as on a periodic basis or upon an estimation that vehicle V1 and/or the owner thereof may soon make a refueling decision. Remote device 120 is aware of the location of vehicle V1 due to remote device 120 receiving GPS location coordinates from telematics device 180, and with that identifies fuel stations in the vicinity of vehicle V1. The fuel information provided by remote device 120 includes, for example, fuel quality data and RON data for the fuel stations identified to be in the vicinity of vehicle V1.

In response to receiving the fuel information at 310 for fuel stations in the vicinity of vehicle V1, a refueling selection is made and vehicle V1 drives or is driven to the selected fueling station at 320. This may, for example, include electronics device 110 displaying or otherwise presenting the fuel information for the in-vicinity fuel stations to the user/owner of electronics device 110 and the user/owner communicating his/her selection of a fuel station to electronics device 110. Alternatively, electronics device 110 or other electronics associated with vehicle V1 automatically selects the fuel station based upon the fuel information received at 310. This may occur, for instance, if vehicle V1 is an autonomous vehicle.

With vehicle V1 being at the selected fueling station #1 at location B (FIG. 2), electronics device 120 wirelessly communicates with the selected fueling station at 330. This communication includes, for example, vehicle V1 sending the recommended fuel grade to fuel station #1, fuel station #1 sending available fuel grades to vehicle V1, and the fuel grade selected for refueling. Following a fuel being selected and/or during or after refueling, vehicle V1 sets or resets a flag at 340 in controller 130 and/or memory 140, referred to as a fueling flag, which identifies whether or not the fuel grade of the fuel to be added correctly corresponds to the recommended fuel grade for vehicle V1.

Upon completion of the refueling at selected fuel station #1 or soon thereafter and before leaving fuel station #1 at location C (FIG. 2), electronics device 120 captures the location of vehicle V1 and/or fuel station #1 at 350. Such location capturing is performed by telematics device 180 using the GPS functionality thereof. Later, after having driven a sufficient distance, electronics device 120, and particularly controller 130, recalculates fuel information at 360 for the vehicle's fuel, such as a calculation corresponding to RON and a calculation corresponding to fuel quality. In the example embodiment in which controller 130 is part of the ECU of vehicle V1, the RON and fuel quality information may be performed as part of normal operation and control of the engine of vehicle V1 by the ECU.

Next, electronics device 110 sends data to remote device 120. Specifically, electronics device 110 sends at 370 the RON and fuel quality calculations calculated at 360, RON and fuel quality calculations performed prior to refueling, the fueling flag value, the fuel grade of the fuel selected, and the location of selected fuel station #1. Having received the data at 370, remote device 120 selectively adds at 380 the received data to a fuel station database maintained in remote device 120, and in particular selectively updates previously acquired information for the selected fuel station #1, appearing in the fuel station database, with the data received at 370. The updating is selective in that if the fuel flag value indicates that the fuel used in refueling vehicle V1 does not match the recommended fuel grade therefor, remote device 120 does not perform an update. By remote device 120 selectively updating the fuel station database with the RON and fuel quality data for the selected fuel station #1, the most current fuel data (RON and fuel quality) for fuel station #1 is available for access by any subscriber wishing to select a fuel station for refueling his/her vehicle.

Further, the fuel station database maintained by remote device 120 may be available for access by subscribers other than those who wish to make refueling decisions. For instance, subscribers may include fuel suppliers for fuel stations so that the suppliers may monitor the fuel delivered to fuel stations to ensure that the delivered fuel meets expected or required RON and fuel quality levels.

The example embodiments described above have been described in association with a vehicle having a gasoline engine, and particularly with an ECU for the gasoline engine. It is understood that the example embodiments of the invention may also be used in association with a vehicle having another type of engine, such as a diesel engine, a compressed natural gas (CNG) engine, or a liquid petroleum gas (LPG) engine. Specifically, if the ECU of vehicles having such engines makes calculations relating to fuel quality and/or an equivalent of RON, the above-described example embodiments can be used with such an ECU.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A method, comprising:
   receiving fuel information from a remote device corresponding to one or more fueling stations in proximity to a vehicle;
   upon the vehicle travelling to a selected one of the one or more fueling stations, communicating directly with the selected one of the one or more fueling stations, comprising sending a recommended fuel grade to the selected one of the one or more refueling stations and receiving therefrom available fuel grades, and setting a flag to a value based upon a fuel grade of fuel used to refuel the vehicle at the selected one of the one or more fueling stations;
   capturing location information for at least one of the vehicle and the selected one of the one or more fueling stations;
   subsequent to refueling at the selected one of the one or more fueling stations and after having travelled at least a predetermined distance from the selected one of the one or more fueling stations, determining fuel information of the fuel used to refuel the vehicle;
   sending the flag, the determined fuel information of the fuel used to refuel the vehicle, and the captured location information to the remote device,
   wherein the received fuel information corresponding to the one or more fueling stations and the determined fuel information for the fuel used to refuel the vehicle comprise at least one of fuel quality information and research octane number (RON) information,
   wherein the method further comprises updating, by the remote device, a fuel station database with the determined fuel information and the captured location information if the value of the flag indicates that the fuel grade of the fuel used to refuel the vehicle matches a recommended fuel grade for the vehicle, and not updating the fuel station database with the determined fuel information and the captured location information if the value of the flag indicates that the fuel grade of the fuel used to refuel the vehicle does not match the recommended fuel grade for the vehicle.

2. The method as claimed in claim 1, further comprising prior to the vehicle traveling to the selected one of the one or more fueling stations, selecting the selected one of the one or more fueling stations based upon the received fuel information.

3. The method as claimed in claim 1, wherein the capturing and the sending are performed by at least one of a vehicle controller of the vehicle and a portable device associated with the vehicle.

4. The method as claimed in claim 1, wherein setting the flag comprises setting the flag to a first value if a fuel grade of the fuel used to refuel the vehicle corresponds to a recommended fuel grade for the vehicle and to a second value otherwise.

5. The method as claimed in claim 1, further comprising prior to receiving the fuel information corresponding to one or more fueling stations in proximity to vehicle, sending a request for the fuel information corresponding to one or more fueling stations in proximity to vehicle.

6. The method as claimed in claim 5, further comprising determining whether an amount of fuel in the vehicle has fallen to or below a threshold fuel level, wherein sending the request is in response to the determination that the amount of fuel in the vehicle has fallen to or below the threshold fuel level.

7. The method as claimed in claim 1, further comprising prior to the vehicle being refueled, determining a second fuel information corresponding to fuel in the vehicle prior to the vehicle being refueled, wherein the sending includes sending the second fuel information to the remote server.

8. The method of claim 1, further comprising:
   selectively assigning, by the remote device, the fuel information for the fuel used to refuel the vehicle and the captured location information to the selected one of the one or more fueling stations;
   subsequent to the selectively assigning, receiving, by the remote device, a request for fuel information relating to the selected one of the one or more fuel stations from a requester; and
   sending the fuel information corresponding for the fuel used to refuel the vehicle to the requester.

9. An electronics device, comprising:
a transceiver configured to wirelessly communicate with one or more remote devices; and
a control unit communicatively coupled to the transceiver, the control unit including non-transitory memory having instructions stored therein which, when executed by the control unit causes the control unit to
receive, from a remote server via the transceiver, fuel information corresponding to one or more fueling stations in proximity to a vehicle associated with the control unit;
upon the vehicle being moved to a selected one of the one or more fueling stations, communicate directly with the fueling station, comprising sending to the selected one of the one or more fueling stations a recommended fuel grade and receiving from the selected one of the one or more fueling stations available fuel grades thereof;
upon the vehicle being moved to the selected one of the one or more fueling stations, set a flag to a value based in part upon a fuel grade of fuel used to refuel the vehicle at the selected one of the one or more fueling stations;
capture location information for at least one of the vehicle and the selected one of the one or more fueling stations;
subsequent to refueling at the selected one of the one or more fueling stations and after having travelled a predetermined distance from the selected one of the one or more fueling stations, calculate fuel information of the fuel used to refuel the vehicle and corresponding to the selected one of the one or more fueling stations; and
cause the transceiver to send to the remote server the value of the flag, the calculated fuel information of the fuel used to refuel the vehicle, and the captured location information,
wherein the remote server is configured to update a fuel station database with the determined fuel information and the captured location information if the value of the flag indicates that the fuel grade of the fuel used to refuel the vehicle matches a recommended fuel grade for the vehicle, and not update the fuel station database with the determined fuel information and the captured location information if the value of the flag indicates that the fuel grade of the fuel used to refuel the vehicle does not match the recommended fuel grade for the vehicle.

10. The electronics device of claim 9, wherein the fuel information corresponding to the one or more fueling stations and the fuel information of the fuel used to refuel the vehicle comprise at least one of fuel quality information and research octane number (RON) information.

11. The electronics device of claim 9, wherein the instructions further include instructions for selecting the selected one of the one or more fueling stations based upon the received fuel information.

12. The electronics device of claim 9, wherein the electronics device includes at least one of a portable electronics device and an electronics device forming part of an electronics system of the vehicle.

13. The electronics device of claim 9, wherein the electronics device includes an engine control unit of the vehicle.

14. The electronics device of claim 9, wherein value of the flag is based in part upon a recommended fuel grade of the vehicle such that the value of the flag indicates whether the fuel used to refuel the vehicle is different from the recommended fuel grade of the vehicle.

15. The electronics device of claim 9, wherein the instructions include instructions which, when executed by the control unit, cause the transceiver to automatically send a request to the remote server for the fuel information corresponding to the one or more fueling stations in proximity to the vehicle, in response to which the control unit receives the fuel information corresponding to the one or more fueling stations.

16. The method of claim 1, further comprising:
estimating, by the remove device, whether at least one of the vehicle and a driver thereof may make a refueling decision in a predetermined time period; and
based upon the estimating, selectively sending, by the remote device, the fuel information corresponding to the one or more fueling stations in proximity to the vehicle.

17. The electronics device of claim 9, wherein the control unit determines the fuel information of the fuel used to refuel the vehicle as part of controlling engine operation of an engine of the vehicle by the electronics device.

18. A system for recording fuel station information, comprising:
a remote server; and
an electronics device of a vehicle, comprising:
a transceiver configured to wirelessly communicate with a remote device; and
a control unit communicatively coupled to the transceiver, the control unit including non-transitory memory having instructions stored therein which, when executed by the control unit causes the control unit to
receive, from the remote server via the transceiver, fuel information corresponding to one or more fueling stations in proximity to a vehicle associated with the control unit;
upon the vehicle being moved to a selected one of the one or more fueling stations, set a flag to a value based in part upon a fuel grade of fuel used to refuel the vehicle at the selected one of the one or more fueling stations;
capture location information for at least one of the vehicle and the selected one of the one or more fueling stations;
subsequent to refueling at the selected one of the one or more fueling stations, calculate fuel information of the fuel used to refuel the vehicle and corresponding to the selected one of the one or more fueling stations; and
cause the transceiver to send to the remote server the value of the flag, the calculated fuel information of the fuel used to refuel the vehicle, and the captured location information;
wherein the remote server is configured to
send to the electronics device the fuel information corresponding to the one or more fueling stations in proximity to the vehicle, receive the value of the flag, the calculated fuel information of the fuel used to refuel the vehicle and the captured location information,
update a fuel station database with the determined fuel information and the captured location information if the value of the flag indicates that the fuel grade of the fuel used to refuel the vehicle matches a recommended fuel grade for the vehicle, and not update the fuel station database with the determined fuel information and the captured location information if the value of the flag indicates that the fuel grade of the fuel used to refuel the vehicle does not match the recommended fuel grade for the vehicle.

19. The system of claim 18, wherein the remote server is further configured to estimate whether at least one of the vehicle and a driver thereof may make a refueling decision within a predetermined time, and based upon the estimate, selectively send the fuel information corresponding to one or more fueling stations in proximity to the vehicle.

* * * * *